(12) United States Patent
Kubota et al.

(10) Patent No.: US 8,094,190 B2
(45) Date of Patent: Jan. 10, 2012

(54) DRIVING SUPPORT METHOD AND APPARATUS

(75) Inventors: Tomoki Kubota, Okazaki (JP); Minoru Takagi, Okazaki (JP)

(73) Assignee: Aisin AW Co., Ltd., Anjo-Shi, Aichi (JP)

( * ) Notice: Subject to any disclaimer, the term of this patent is extended or adjusted under 35 U.S.C. 154(b) by 1225 days.

(21) Appl. No.: 11/822,077

(22) Filed: Jul. 2, 2007

(65) Prior Publication Data

US 2008/0012938 A1    Jan. 17, 2008

(30) Foreign Application Priority Data

Jul. 12, 2006  (JP) ................................. 2006-192033

(51) Int. Cl.
*H04N 7/18* (2006.01)
*G06F 15/16* (2006.01)
(52) U.S. Cl. ...................................................... 348/118
(58) Field of Classification Search ........... 348/113–118
See application file for complete search history.

(56) References Cited

U.S. PATENT DOCUMENTS

| | | | | |
|---|---|---|---|---|
| 4,907,870 A * | 3/1990 | Brucker | ........................ | 359/875 |
| 6,175,300 B1 * | 1/2001 | Kendrick | ....................... | 340/436 |
| 6,882,287 B2 * | 4/2005 | Schofield | ....................... | 340/903 |
| 7,057,500 B1 * | 6/2006 | Belloso | ......................... | 340/435 |
| 2004/0004541 A1 | 1/2004 | Hong | ............................. | 340/435 |
| 2004/0148057 A1 * | 7/2004 | Breed et al. | .................... | 700/242 |
| 2005/0063080 A1 | 3/2005 | Xiao | ............................. | 359/871 |
| 2005/0168695 A1 | 8/2005 | Ooba et al. | ..................... | 353/13 |
| 2005/0195383 A1 * | 9/2005 | Breed et al. | .................. | 356/4.01 |
| 2006/0167606 A1 * | 7/2006 | Malhas | .......................... | 701/49 |
| 2008/0012938 A1 * | 1/2008 | Kubota et al. | ................. | 348/118 |
| 2008/0169938 A1 * | 7/2008 | Madau | ........................... | 340/901 |
| 2011/0037725 A1 * | 2/2011 | Pryor | ............................ | 345/174 |

FOREIGN PATENT DOCUMENTS

| | | |
|---|---|---|
| EP | 1 285 814 | 2/2003 |
| JP | 09-309372 | 12/1997 |
| JP | 2001-116841 | 4/2001 |
| JP | 2004-064131 | 2/2004 |
| JP | 2005-184225 | 7/2005 |
| JP | 2006-135797 | 5/2006 |

* cited by examiner

*Primary Examiner* — Zarni Maung
(74) *Attorney, Agent, or Firm* — Bacon & Thomas, PLLC

(57) ABSTRACT

A driving support unit captures an image of a driver's blind spot due to presence of a pillar of a vehicle includes at least first and second cameras which are mounted on the vehicle, a display device for displaying the image on the interior surface of the pillar and a control section for detecting position of the head of the driver, calculating a blind spot angle due to the presence of the pillar in accordance with the position of the head of the driver, and for selecting, based on the calculated angle, one of the cameras to capture the image. The first camera captures an image the major portion of which is an area to the side of the vehicle, and the second camera captures an image the major portion of which is an area to the front of the vehicle.

12 Claims, 10 Drawing Sheets

DRIVING SUPPORT METHOD AND APPARATUS

INCORPORATION BY REFERENCE

The disclosure of Japanese Patent Application No. 2006-192033 filed on Jul. 12, 2006, including the specification, drawings and abstract thereof, is incorporated herein by reference in its entirety.

BACKGROUND OF THE INVENTION

1. Field of the Invention

The present invention relates to a driving support method and apparatus.

2. Description of the Related Art

In-vehicle systems for capturing an image of area which is hidden from the driver as a blind spot, using an on-board camera, and for displaying the image on a display monitor are known. One such system uses an on-board camera to capture an image of area which is hidden from the driver's view by a front pillar in the vehicle and displays the image on the interior surface of the front pillar. The front pillars are located to the right and left front of the driver to support the front window and the roof of the vehicle and obstruct the driver's view. However, the front pillars are required to have certain dimensions to ensure the safety of the driver.

The system described above includes an in-vehicle (on-board) camera, an image processor for processing an image signal output from the in-vehicle camera, a display which is mounted on the interior side of the front pillar for display of the image, and a projector for projecting the image onto the interior surface of the front pillar. Such a system provides the driver with a front view, as if the front pillars were transparent, and allows the driver to see a road shape and/or an obstacle in front of the vehicle at an intersection that otherwise could not be seen. However, problems remain as to how to display images corresponding to the movement of the driver and how to display images smoothly contiguous with the driver's actual view.

The apparatus disclosed in Japanese Unexamined Patent Application Publication ("Kokai") No. 2005-184225 captures images of areas surrounding a vehicle with in-vehicle cameras, the cameras being individually attached at right and left side mirrors, and projects the images onto interior surfaces of front pillars of the vehicle. The apparatus further detects coordinates of the eyes of the driver of the vehicle and corrects the images provided by the cameras on the basis of the detected positions of the eyes of the driver.

However, with the apparatus described in Japanese Kokai 2005-184225, each image is respectively generated by a single one of the cameras, so that the generated image extends over only a limited viewing area even if the apparatus detects the coordinates of the eyes of the driver and corrects the image on the basis of those detected coordinates. More specifically, for example, in the case of a vehicle with a right side steering wheel, the driver seated in the driver's seat of the vehicle may see an obstacle located to the front and right of the vehicle if the driver leans forward and peers at the area to the front and right of the vehicle, through the front window. However, the driver may not be able to see that obstacle if his/her back remains in position against the back of the seat (hereinafter, "standard posture"). Further, even in the case of an obstacle which can be seen both when the driver leans forward and when the driver remains in the standard posture, there is both a visible side and an invisible side of the obstacle, depending on the position of the driver. The apparatus described in Japanese Kokai 2005-184225 uses only 2D coordinates in the image processing and an entire obstacle or a side of an obstacle located out of the range (field of view) of the camera may not be displayed. Therefore, when the driver has any posture other than the standard posture, the image displayed on the surface of the pillar may not be merged (made contiguous) properly with the actual view of the driver from the front window and the door window.

SUMMARY OF THE INVENTION

Accordingly, it is an object of the present invention to provide a driving support method and apparatus for displaying an image on a front pillar of the vehicle which changes in correspondence with the driver's posture.

Accordingly, the present invention provides a driving support method for capturing an image of area which is hidden as a blind spot of a driver of a vehicle because of presence of a pillar of the vehicle, the method including: detecting a position of the driver seated in the driver's seat of the vehicle; selecting one of a plurality of imaging devices mounted on the vehicle to capture an image, the plurality of imaging devices capturing images of different areas, in accordance with the position of the driver; and displaying an image on the interior surface of a pillar on the basis of an image signal input from the selected imaging device.

The present invention also provides a driving support apparatus for capturing an image of an area which is hidden from the driver's view by a pillar of the vehicle, the apparatus including: a plurality of imaging devices, mounted on the vehicle, which imaging devices capture images of different areas, a detecting device for detecting position of the driver who is seated in a driver's seat in the vehicle; a selecting device for selecting one of the imaging devices in accordance with the detected position of the driver; an image signal obtaining device for inputting an image signal from the selected imaging device; and an output control device for displaying an image of the area, which is hidden as the driver's blind spot, on the interior surface of the pillar in the vehicle on the basis of the image signal which is input from the selected imaging device.

The present invention also provides a driving support apparatus for capturing an image of area which is hidden as a blind spot of the driver of a vehicle because of a presence of a pillar of the vehicle, the apparatus including: mounted on the vehicle, a plurality of imaging devices which capture images of different areas, a detecting device for detecting position of the driver who is seated in the driver's seat of the vehicle; an angle calculating device for calculating an angle of the blind spot on the basis of the position of the driver detected by the detecting device; a selecting device for selecting one of the plural imaging devices in accordance with the calculated blind spot angle; an image signal obtaining device for inputting an image signal from the selected imaging device; and an output control device for displaying an image of the driver's blind spot on the interior surface of the pillar in the vehicle on the basis of the image signal which is input from the imaging device.

According to the present invention, the position of the driver is detected and one imaging device is selected from a plurality of the imaging devices in accordance with the detected position of the driver and the image provided by the selected imaging device is displayed on the interior surface of the pillar. Therefore, even if the driver changes his/her posture, an appropriate imaging device may be selected according to the position of the driver and the image displayed on the pillar may be smoothly connected with the driver's actual view from, for example, the front window.

The selecting device may select, provided that a maximum blind spot angle is less than a predetermined horizontal angle, a first imaging device to capture an image of an area, the major portion of which is to the front side of the vehicle, or select, provided that the maximum blind spot angle is equal to or greater than the predetermined angle, a second imaging device to capture an image area, the major portion of which is directly to the front of the vehicle. That is, when the blind spot angle faces right or left forward, the first imaging device is employed to capture the image, the major portion of which is the front side area of the vehicle and when the blind spot angle faces forward, the second imaging device is employed to capture the image, the major portion of which is the area in front of the vehicle. Therefore, even if the driver changes his/her posture, an appropriate imaging device may be selected according to the position of the driver and the image displayed on the pillar may be made smoothly contiguous with the driver's actual view from, for example, the front window.

The apparatus of the present invention may further include an image processing device for image processing of the image signal input from the imaging device in accordance with the position of the driver.

In one embodiment, not only is the appropriate imaging device selected in accordance with the position of the driver but also the image signals input from the first imaging device or the second imaging device are processed in accordance with the position of the driver. Therefore, the image displayed on the pillar is properly connected (contiguous) with the driver's actual view.

The detecting device detects coordinates of the head of the driver to obtain a relatively accurate determination of the posture of the driver.

DESCRIPTION OF THE PREFERRED EMBODIMENTS

Figure 1:
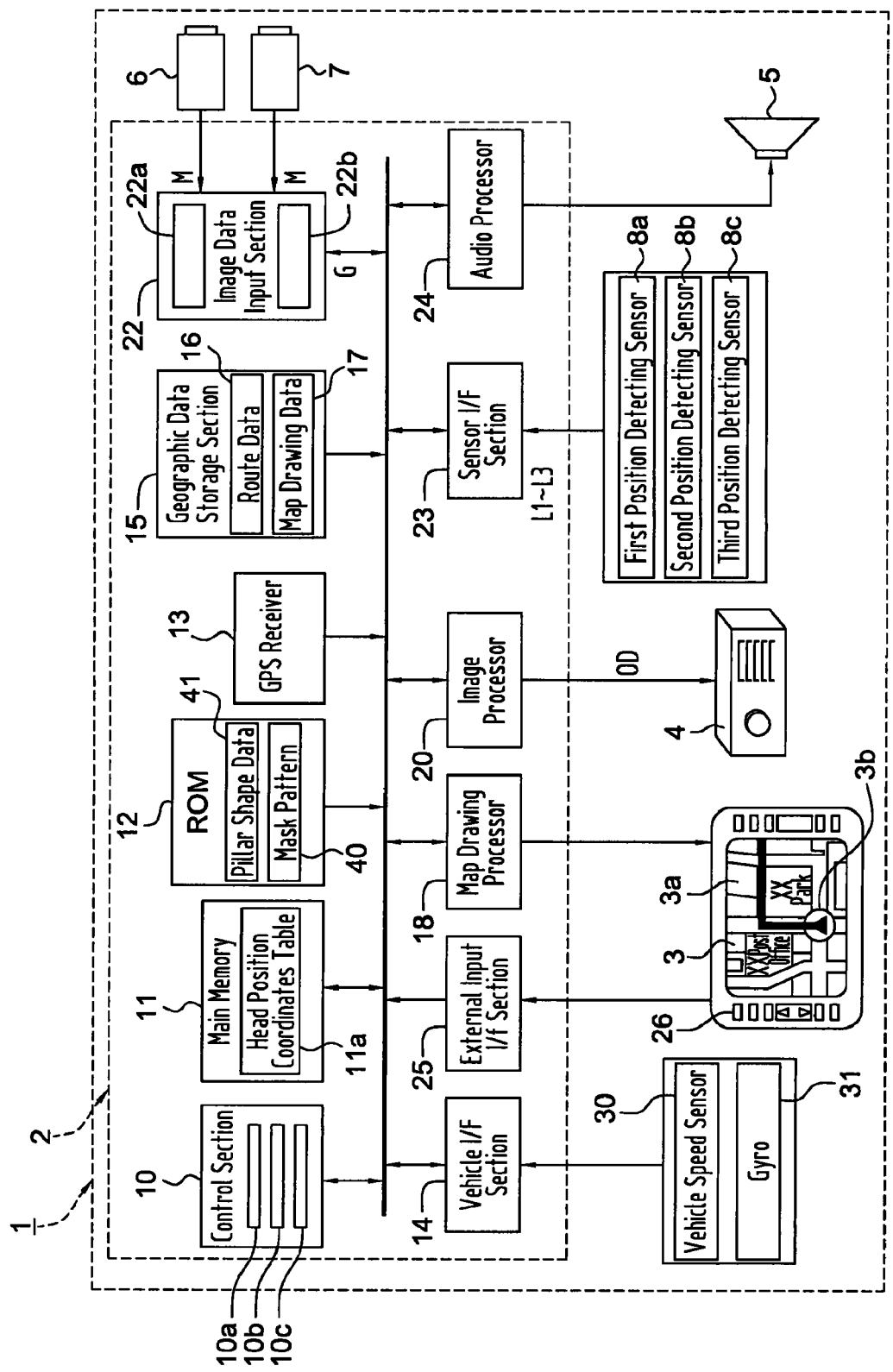
FIG. 1 is a block diagram showing one embodiment of a driving support system of the present invention.

An embodiment of the present invention will now be described with reference to FIGS. 1 through 17 below. As shown in FIG. 1, the driving support system 1 is installed in a vehicle C (in FIG. 2) and includes a driving support unit 2 (driving support device), a display device 3, a projector 4, a speaker 5, a first camera 6 and a second camera 7 (imaging devices), and first through third position detecting sensors 8a through 8c.

The driving support unit 2 includes a control section 10 which serves as a detecting device 10a, a selecting device 10b, and an angle calculating device 10c. A nonvolatile main memory 11, a ROM 12, and a GPS receiver 13 are also included in the driving support unit 2. The control section 10 is, for example, a CPU, an MPU, or an ASIC, and serves mainly to control various operations on the basis of a driving support program stored in the ROM 12. The main memory 11 temporarily stores calculations output by the control section 10.

The control section 10 receives a location detection signal indicating coordinates, such as latitude/longitude, which are generated by a GPS satellite and received by the GPS receiver 13, and calculates absolute location of the vehicle in which the driving support system is installed by means of electronic navigation. The control section 10 further receives vehicle speed pulses and angular velocity signals from, respectively, a vehicle speed sensor 30 and a gyro 31, both of which are mounted in the vehicle, through a vehicle I/F section 14 of the driving support unit 2. The control section 10 calculates a relative location on the basis of the origin location by means of autonomous navigation using the vehicle speed pulses and the angular velocity and specifies the current vehicle location on the basis of the relative location calculated by autonomous navigation and the absolute location calculated by electronic navigation.

The driving support unit 2 may include a geographic data storage section 15 which is an internal hard drive or an external storage device such as an optical disk and which stores route network data (map data) for searching for a route to a destination (hereinafter referred to as route data 16) and map drawing data 17 for outputting a map screen 3a on the display device 3.

The route data 16 is data for roads within areas divided by a mesh grid on a map. The route data 16 may include, for example, a mesh ID as an identifier of each mesh area, a link ID as an identifier of each link in the mesh, and a link cost. The control section 10 searches for a recommended route to a destination using route data 16 and determines when the vehicle C has approached a point for which guidance is to be given, such as an intersection.

As used herein, the term "link" refers to, for example, a road or portion of a road. For example, each road may consist of a plurality of units called links. Each link may be separated and defined by, for example, an intersection, an intersection having more than three roads, a curve, an expressway entry point, and/or a point at which the road type changes.

The map drawing data 17 is data used to draw a road shape and/or a view from the driver and is stored in correlation with each mesh unit into which the map is divided, e.g. a national map. The control section 10 determines whether there is a curve, with a radius of curvature equal to or greater than a predetermined value, in front of the vehicle C, on the basis of road shape data included in the map drawing data 17.

As shown in FIG. 1, the driving support unit 2 may further include a map drawing processor 18 which reads out the map drawing data 17 from the map data storage section 15 to draw a map of an area surrounding the vehicle C. The map drawing processor 18 further generates data for outputting the map and temporarily stores the data in a VRAM (not shown). The map drawing processor 18 also outputs image signals on the basis of the generated data to draw the map on the display device 3 as a map screen 3a shown in FIG. 1. The map drawing processor 18 further superimposes a vehicle position indicator 3b, indicating the current position of the vehicle C, on the map screen 3a.

The driving support unit 2 may also include an audio processor 24 which has an audio file (not shown) and which outputs, for example, audio guidance for the route to the destination from the speaker 5. The driving support unit 2 may further include an external input I/F section 25. The external input I/F section 25 receives an input signal which is generated by operation of a switch 26 located next to the display 3 and/or by operation of the display device 3, which is a touch panel and outputs the signal to the control section 10.

The driving support unit 2 may further include an image data input section 22 (image signal obtaining device) and an image processor 20 for receiving image data G from the image data input section 22 which serves as an output control device 22a and an image processing device 22b. The image data input section 22 activates the first camera 6 or the second camera 7, both of which are mounted on the vehicle C, and receives an image signal M provided by the first camera 6 or the second camera 7 under control of the control section 10.

Figure 2:
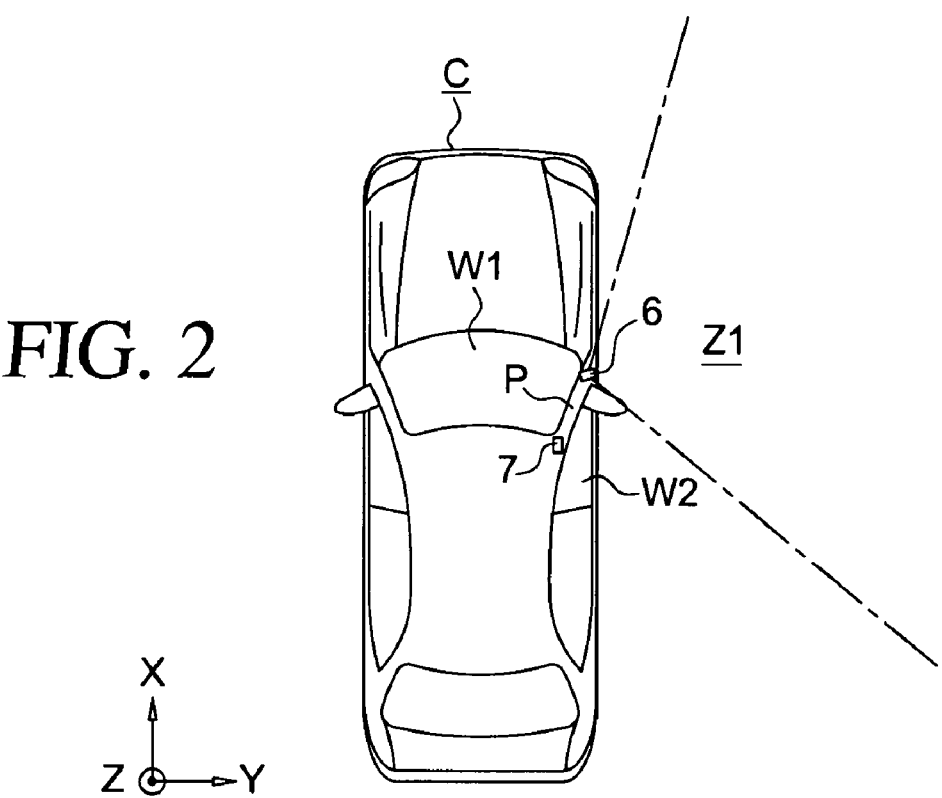
FIG. 2 is a diagram showing a range (field of view) of a first camera.

The first camera 6 is a color digital camera which has an optical system including a lens, a mirror, etc. and a CCD image sensor. As shown in FIG. 2, the first camera 6 is mounted on the exterior lower side of the right front pillar of the vehicle C (hereinafter referred to as pillar P) and has its optical axis pointed to an area to the front and right of the vehicle C. In this embodiment, the vehicle C is right-side driven, so that the first camera 6 is attached on the right side (the driver seat side) of the vehicle C. The first camera 6 captures an image of a region Z1 which includes the area to the front and right of the vehicle C and a part of the right side body of the vehicle C.

Figure 3:
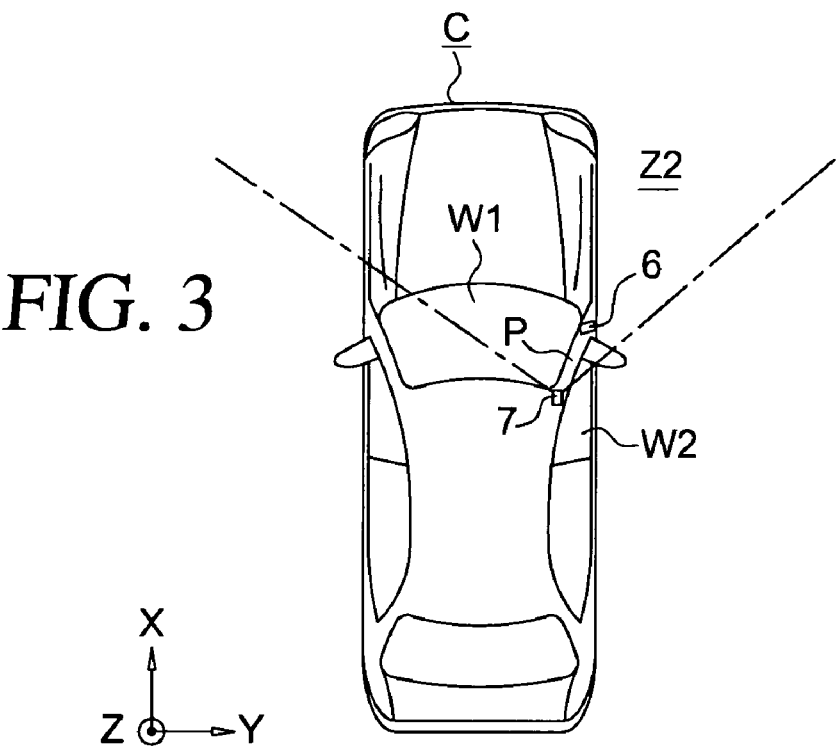
FIG. 3 is a diagram showing a range of a second camera.

The second camera 7 has the same structure as the first camera 6. As shown in FIG. 3, the second camera 7 is mounted on the exterior upper side of the pillar P. Thus, the first camera 6 and the second camera 7 are mounted at the opposing upper and lower ends of the pillar P. Because the pillar P is inclined, the positions of the two cameras are different from each other in all directions including the direction of the vehicle length, parallel to the shaft of the vehicle C (X-direction in FIG. 3), a vehicle width direction (Y-direction in FIG. 3) and the vertical direction (Z-direction in FIG. 3). The second camera 7 is located behind the first camera 6 in the X-direction and takes a picture of a region Z2 which is mainly the area in front of the vehicle C. Therefore, the first camera 6 takes a picture of an area positioned further to the side (right side in this embodiment) of the vehicle C than does the second camera 7. As a result, an obstacle which is located to the front and right of the vehicle C is more likely to enter the range (field of view) of the first camera 6 than that of the second camera 7.

The image signal M provided by the first camera 6 or the second camera 7 is digitalized and converted into image data G by the image data input section 22, which image data G is then output to the image processor 20. The image processor 20 processes image data G and outputs the processed image data G to the projector 4.

Figure 4:
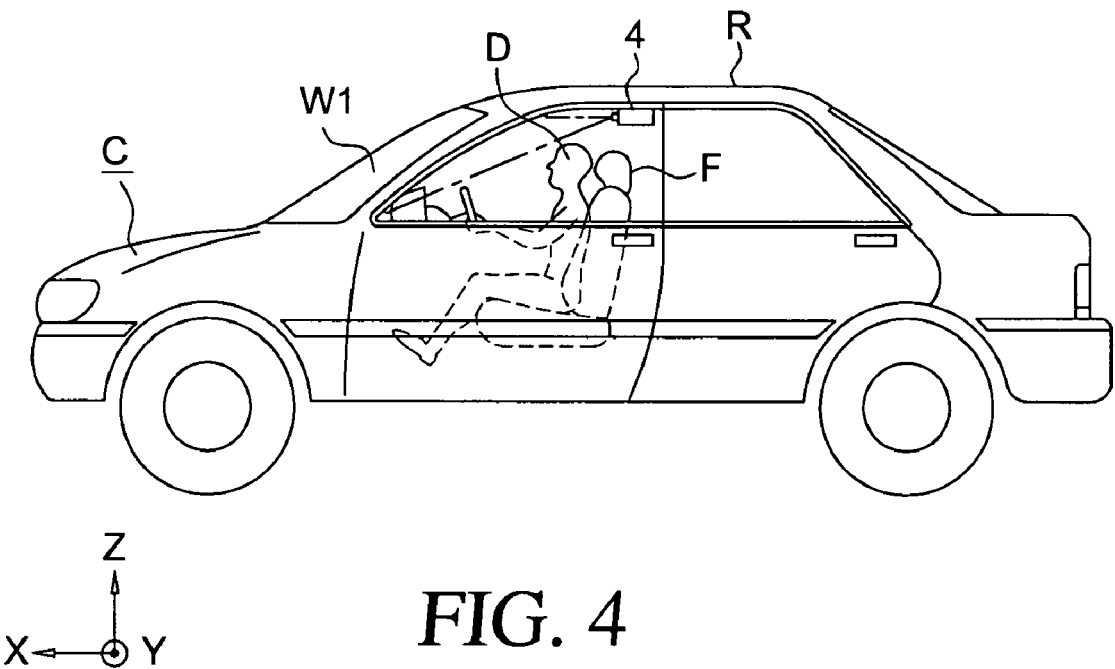
FIG. 4 is a diagram showing positions of a projector and a pillar.
Figure 5:
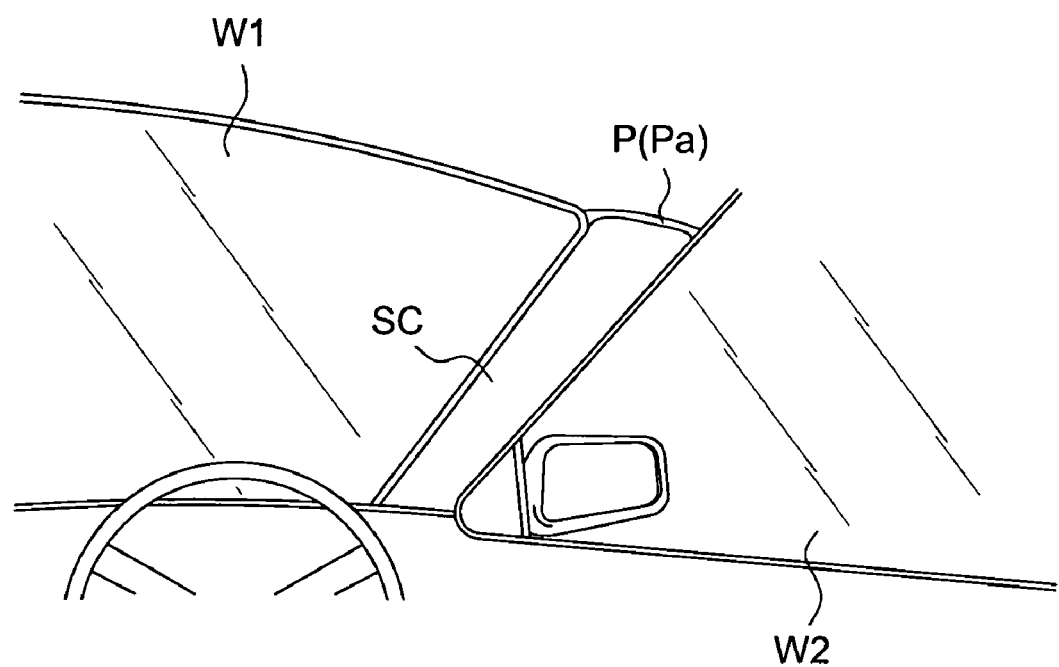
FIG. 5 is a view showing the interior surface of the pillar.

As shown in FIG. 4, the projector 4 is attached on the interior of roof R and above front seat F in which driver D seated. In this embodiment, the projector 4 projects an image onto the surface of the right pillar P of the vehicle C (FIG. 5). As shown in FIG. 5, a screen SC, which is cut in accordance with the shape of the pillar P, is attached onto the interior surface Pa of the pillar P. The focus of the projector 4 is adjusted for the screen SC. If a clear image can be projected directly onto the interior surface Pa of the pillar P, i.e. if the material and the shape of the inner side Pa so allow, the screen SC need not be used.

Figure 6:
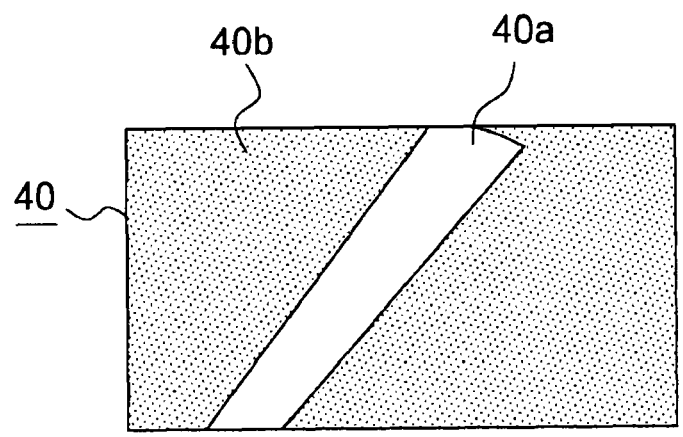
FIG. 6 is a diagram of a mask pattern.

As shown in FIG. 1, a mask pattern 40 and pillar shape data 41 are stored in the ROM 12 of the driving support unit 2 in advance, during manufacture of the unit. As shown in FIG. 6, the mask pattern 40 is data for masking image data G and includes an image display section 40a, whose shape coincides with the shape of the interior surface of the pillar P, and a mask 40b. The image processor 20 uses pixel data, i.e. image data G which is provided by the first camera 6 or the second camera 7, for generating output data OD for the image display section 40a. Simultaneously, for the mask 40b, the image processor 20 uses pixel data provided by the projector 4 which is not for displaying and generates second output data OD. The image processor 20 outputs both the first and second output data OD to the projector 4. As a result, an image is projected only on the screen SC on the pillar P. No image is projected onto any area surrounding the screen SC, such as the front window W1 or the door window W2, because of the mask 40b.

Pillar shape data 41 is data including a pattern or coordinates defining the outline of the pillar and such data is unique for each vehicle C. The control section 10 may obtain 3D coordinates (X, Y, Z), which represent the direction of the length the vehicle, the width of the vehicle, and the vertical, respectively, for the outline of the pillar P from the pillar shape data 41. Further, the control section 10 may obtain 3D coordinate data for the width and/or the length of the pillar P.

As shown in FIG. 1, the driving support unit 2 may include a sensor I/F section 23 as a detecting device. The sensor I/F section 23 receives signals from the first through third position detecting sensors 8a through 8c. The first through third position detecting sensors 8a through 8c are ultrasonic sensors and are mounted in the vehicle C, especially in the area surrounding the driver D seated in the front seat F. The first position detecting sensor 8a is attached to the rear view mirror RM about level with or a little higher than the head D1 of the driver D.

Figure 8:
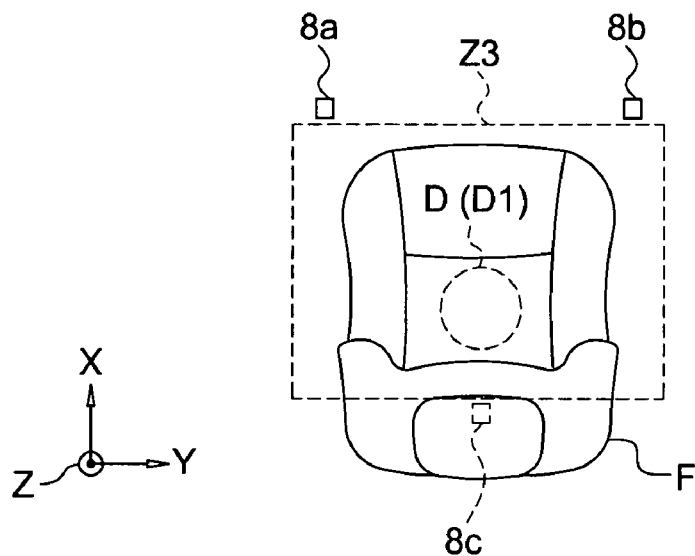
FIG. 8 is a top plan view showing positions of sensors.

As shown in FIG. 8, the second position detecting sensor 8b is attached on the upper side of the door window W2 (FIG. 5), to the upper right of the driver D. According to the present embodiment, the second position detecting sensor 8b is located at about the same X-axis position as the first position detecting sensor 8a.

Figure 7:
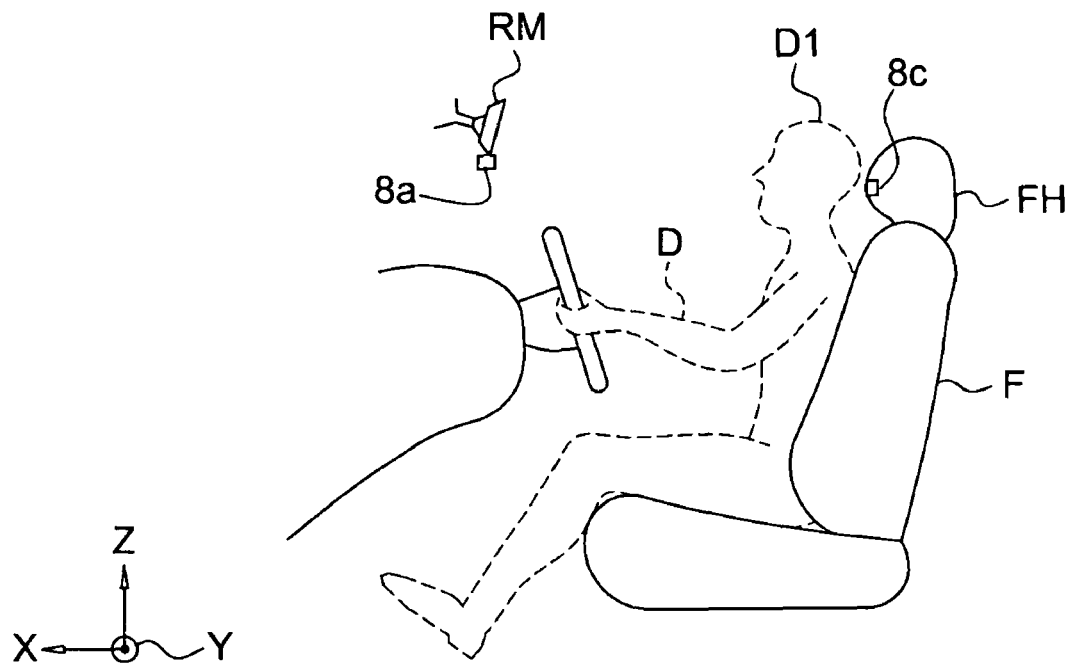
FIG. 7 is a side view showing position of a sensor.

As shown in FIG. 7, the third position detecting sensor 8c is embedded within headrest FH of the front seat F at a position lower (on the Z-axis) than the first and second position detecting sensors 8a and 8b. Further, as shown in FIG. 8, the third position detecting sensor 8c is located between the first position detecting sensor 8a and the second position detecting sensor 8*b* on the Y-axis and to the rear of the first and second position detecting sensors 8*a* and 8*b* on the X-axis, as shown in FIG. 8.

Each of the position detecting sensors 8*a* through 8*c* emits ultrasonic waves which are reflected from the head D1 of the driver D. Each of position detecting sensors 8*a* through 8*c* determines the time between emitting the ultrasonic waves and receiving the reflected waves and calculates relative distances L1 through L3, which extend between each position detecting sensor and the head D1, on the basis of the determined times. The relative distances L1 through L3 are output to the control section 10 through the sensor I/F section 23. Note that the sensor I/F section 23 may calculate the relative distances L1 through L3, instead of each position detecting sensor, on the basis of the signals from the position detecting sensors 8*a* through 8*c*.

As shown in FIG. 1, a head position coordinates table 11*a*, used for calculating coordinates of a center point Dc of the head D1, is stored in the nonvolatile main memory 11. The head position coordinates table 11*a* correlates the standard coordinates of the center points Dc of the head position D1 with the relative distances L1 through L3. More specifically, a head moving range Z3 (FIG. 8), the ranges of detection of the first through third position detecting sensors (8*a*, 8*b* and 8*c*) and the range through which the head position D1 of the driver D may be moved, based on standard driver body proportions, is preset. According to the head moving range Z3, certain patterns of combinations of the relative distances L1 through L3, which are detected by the first through third position detecting sensors 8*a* through 8*c*, and the coordinates of the center points Dc of the head D1 are developed, so that the coordinates of the center point Dc of the head D1 may be obtained by applying the relative distances L1 through L3 to the head position coordinates table 11*a*. A plurality of tables corresponding to different driver body types may be stored as head position coordinates tables 11*a*. Further, body shape data for the driver D such as seat height and/or an eye level, may be registered in the driving support unit 2 in advance and the control section 10 may generate a head position coordinates table 11*a* on the basis of that registered data.

Figure 9:
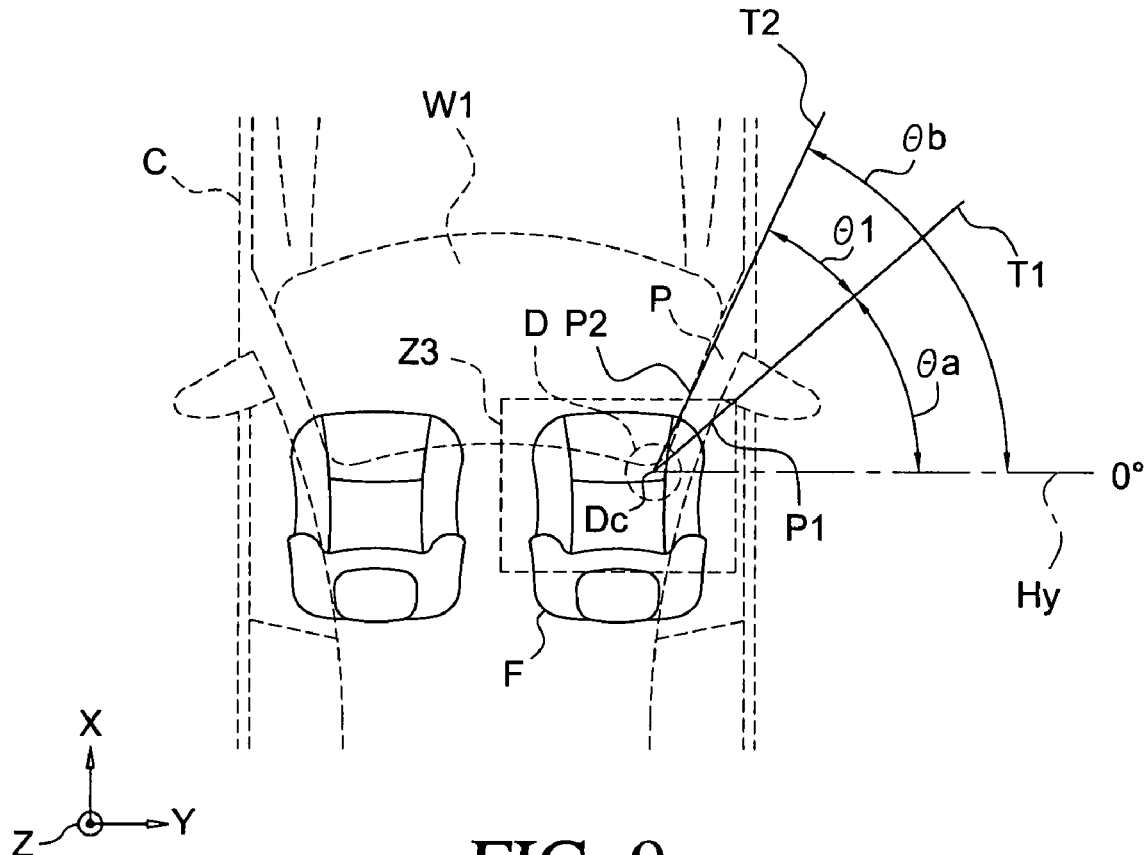
FIG. 9 is a diagram showing, horizontally, the blind spot of a driver when the driver leans his/her head forward and to the right.
Figure 10:
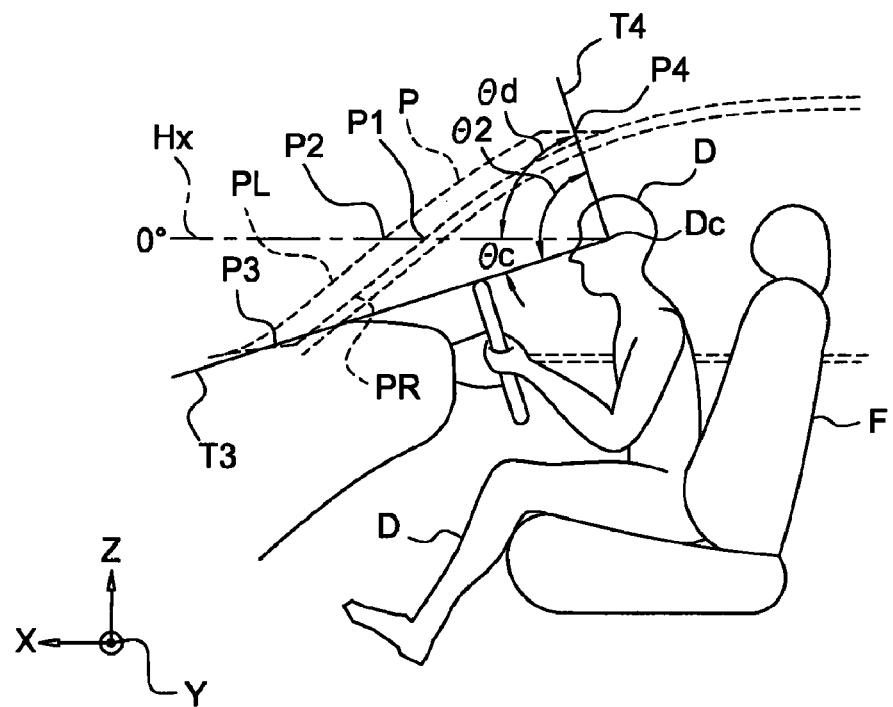
FIG. 10 is a diagram showing, vertically, the blind spot of the driver when the driver leans his/her head forward and to the right.

Next, the control section 10 calculates angles $\theta 1$ and $\theta 2$, which are angles of a blind spot due to the presence of the pillar P, based on the coordinates of the center point Dc. More specifically, as shown in FIG. 9 and FIG. 10, tangent lines T1 through T4 of the coordinates of the center point Dc of the head position D1 and the pillar P are calculated. T1 and T2 are horizontal (FIG. 9) and T3 and T4 are inclined relative to the horizontal (FIG. 10). The angle between the tangent lines T1 and T2 and the angle between the tangent lines T3 and T4 are then calculated.

The horizontal tangent lines T1 and T2 are calculated as follows. As shown in FIG. 10, the control section 10 finds contact points P1 and P2, which are on the opposing side edges of the long dimension of the pillar P and at the same level as the center point Dc of the head position D1, on the basis of pillar shape data 41 stored in the ROM 12. Then, lines are connected between the contact points P1/P2 and the center point Dc to obtain tangent lines T1/T2 as shown in FIG. 9. Note that, to calculate the tangent lines T1 and T2, the contact points P1 and P2 do not have to be at the same level as the center point Dc. For example, midpoints on the longer sides of the pillar P may be set as the contact points P1 and P2.

The control section 10 calculates the blind spot horizontal angle $\theta 1$ between the tangent lines T1 and T2. The control section 10 sets a horizontal line Hy as the horizontal, widthwise axis of the vehicle (Y-axis) (the horizontal line is set as an angle 0) and calculates an angle $\theta a$ between the horizontal line Hy and the tangent line T1 (hereinafter referred to as minimum angle $\theta a$) and an angle $\theta b$ between the horizontal line Hy and the tangent line T2 (hereinafter referred to as maximum angle $\theta b$).

Meanwhile, on the basis of the pillar shape data 41, the control section 10 calculates the tangent line T3 connecting the lowest point P3 of the pillar P and the center point Dc of the head D1 and the tangent line T4 connecting the highest point P4 of the pillar P and the center point Dc of the head D1 as shown in FIG. 10. The angle between the tangent line T3 and the tangent line T4 is the blind spot vertical angle $\theta 2$. Further, the control section 10 sets a horizontal line Hx extending from the center point Dc along the X-axis as 0 degrees and calculates an angle $\theta c$ between the horizontal line Hx and the tangent line T3 (hereinafter referred to as minimum angle $\theta c$) and an angle $\theta d$ between the horizontal line Hx and the tangent line T4 (hereinafter referred to as maximum angle $\theta d$).

After calculating the blind spot angles $\theta 1$ and $\theta 2$, the maximum angles $\theta b$ and $\theta d$, and the minimum angles $\theta a$ and $\theta c$, the control section 10 determines whether the maximum horizontal angle $\theta b$ is less than a predetermined angle A (for example, 45 degrees) and whether the maximum vertical angle $\theta d$ is equal to or greater than a predetermined angle $\theta$ (for example, 15 degrees). Note that the predetermined angles A and B may be set according to the structure of the vehicle C, so that the values of the angles A and B given above may vary as between different vehicles.

When the maximum angle $\theta b$< the predetermined angle A and the maximum angle $\theta d \geqq$ the predetermined angle B, the field of view of the driver in the right front direction may be relatively large, so that the first camera 6 is operated to capture an image. Under any other conditions, the driver D may not see an area ahead in the right front direction but only an area near the vehicle C and, therefore, the second camera 7 is used to capture the image of the area ahead.

For example, as shown FIG. 9, when the head position D1 leans forward and to the right within the head moving range Z3, the maximum horizontal angle $\theta b$ is equal to or greater than 45 degrees. Further, as shown in FIG. 10, when the head position D1 leans forward and to the right within the head moving range Z3, the maximum vertical angle $\theta d$ is equal to or greater than 15 degrees. That is, the maximum angle $\theta d$ in the vertical direction is equal to or greater than the predetermined angle $\theta$ and the maximum horizontal angle $\theta b$ is equal to or greater than the predetermined angle A, so that the control section 10 uses the second camera 7 to capture the image because the second camera 7 is located close to the head position D1 which currently leans forward and to the right.

After capturing the image, the second camera 7 outputs image data G to the image processor 20 through the image data input section 22. The image processor 20 processes the image data as described above, generates output data OD using the mask pattern 40, and outputs the generated output data OD to the projector 4. As a result, when the head position D1 leans forward and to the right within the head moving range Z3, the image which is contiguous with the actual view through the front window W1, as seen from the driver's eyes, may be displayed on the screen SC on the pillar P.

Figure 11:
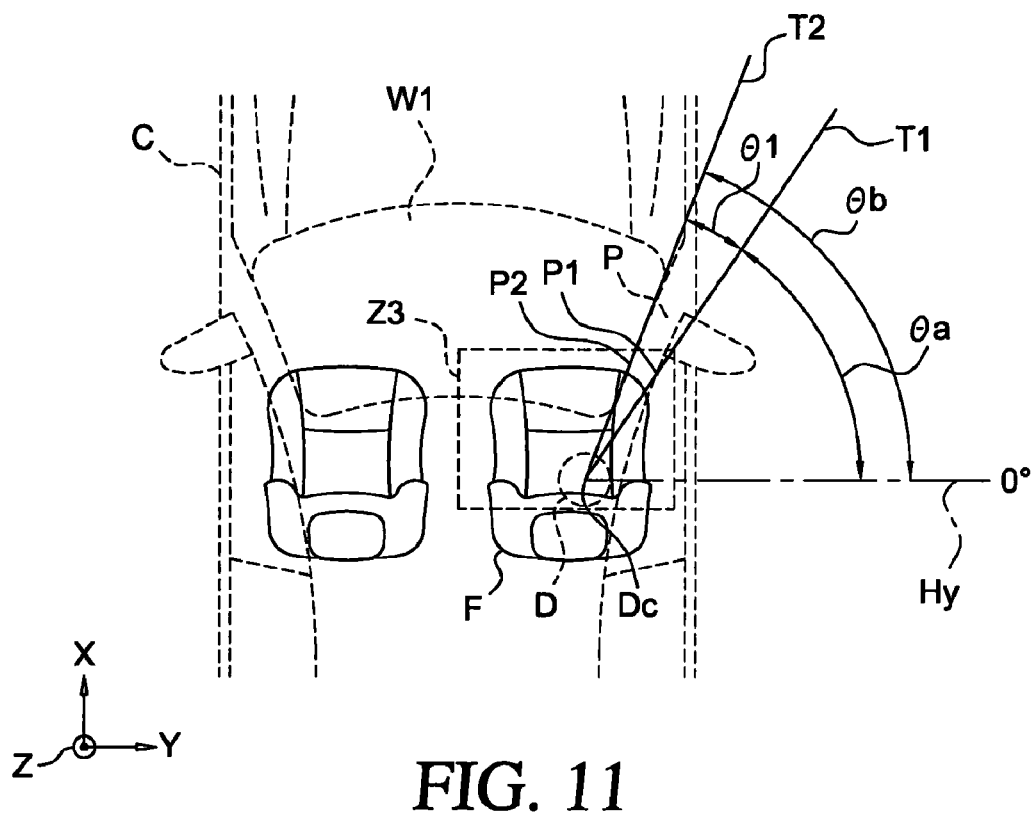
FIG. 11 is a diagram showing, horizontally, the blind spot of the driver when the driver leans his/her head backward and to the right.
Figure 12:
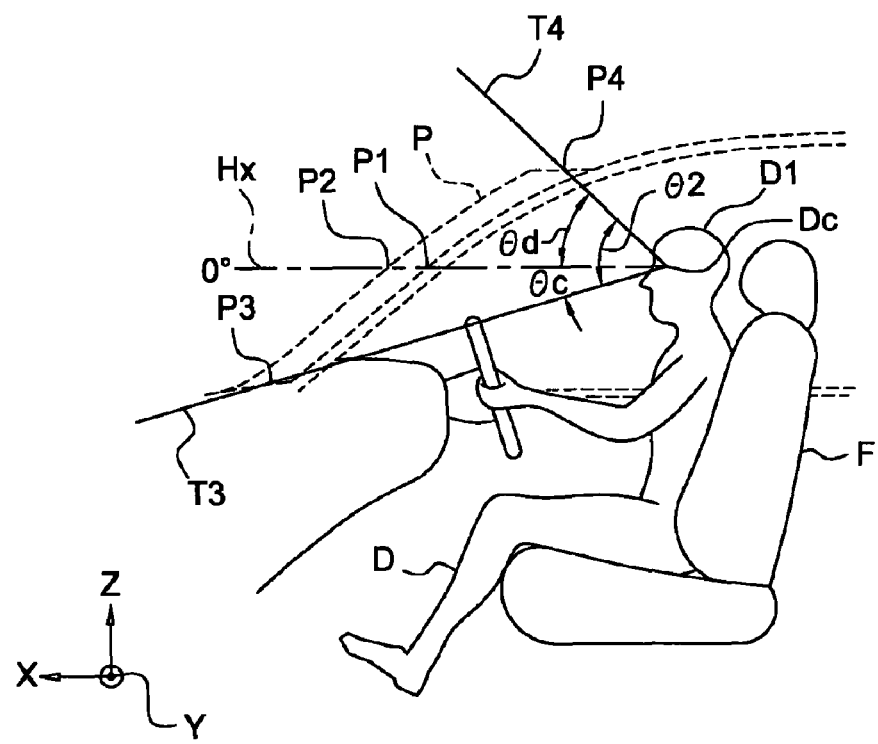
FIG. 12 is a diagram showing, vertically, the driver's blind spot when the driver the leans his/her head backward and to the right.

In the same way, for example, as shown in FIGS. 11 and 12, when the coordinates of the center point Dc show the head D1 leaning backward and to the right within the head moving range Z3, the maximum horizontal angle $\theta b$ is equal to or greater than the predetermined angle A (45 degrees) and the maximum vertical angle $\theta b$ is less than the predetermined angle B (15 degrees). That is, the driver D is looking ahead and the driver's view is similar to the view of the second camera 7. Therefore, the second camera 7 which is close to the head D1 is activated.

Figure 13:
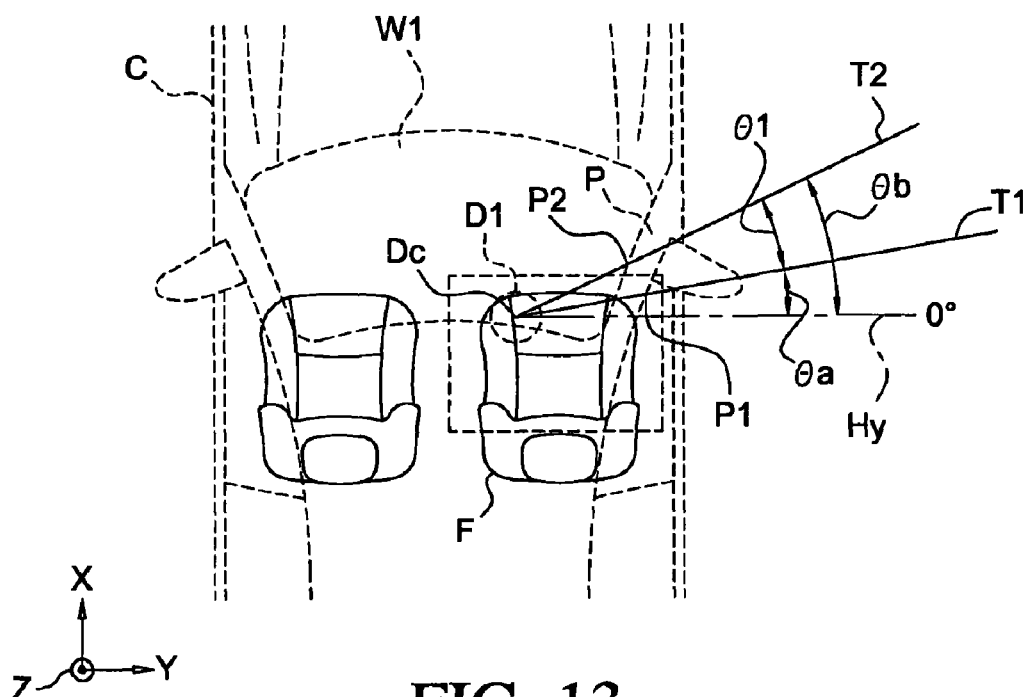
FIG. 13 is a diagram showing, horizontally, the driver's blind spot when the driver leans his/her head forward and to the left.

As shown in FIG. 13, when the center point Dc of the head D1 is leaned forward and to the left within the head moving range Z3, the maximum horizontal angle θb is less than the predetermined angle A (45 degrees) and the maximum vertical angle θd is equal to or greater than the predetermined angle B (15 degrees). In this case, the head D1 of the driver D has moved closer to the front window W1 (along the X-axis), is relatively vertically low (on the Z-axis) and is relatively far from the pillar P in the vehicle widthwise direction (Y-axis). That is, the driver D is looking at the area in the right front direction from the front window W1 to avoid the pillar P. By leaning in this manner, the driver D may easily see obstacles in the right front direction and may even see the entire or a part of an obstacle which can not be seen when leaning the driver's head back against the front seat F. Therefore, the control section 10 activates the first camera 6 which captures an image of an area mainly to the right front and the right of the vehicle.

After capturing the image, the first camera 6 outputs image data G to the image processor 20 through the image data input section 22. The image processor 20 converts image data G into coordinates, generates output data OD, and outputs the generated output data OD to the projector 4 as described above. Therefore, when the driver views another vehicle and/or an obstacle located in the right front direction from a slouched position, the other vehicle and/or the obstacle may be projected on the screen SC.

Figure 14:
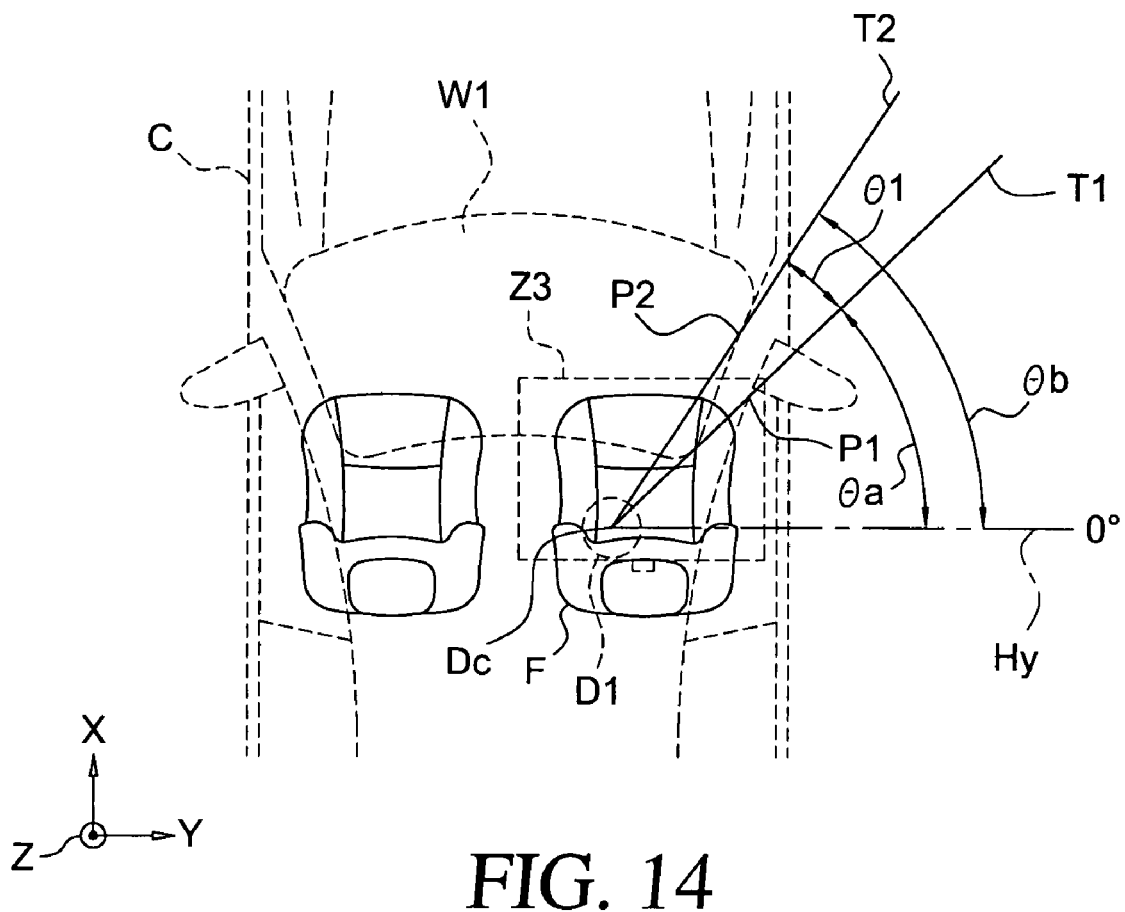
FIG. 14 is a diagram showing, horizontally, the driver's blind spot when the driver leans his/her head backward and to left.

Further, as shown in FIG. 14, when the head D1 is leaned backward and to the left within the head moving range Z3, the maximum horizontal angle θb is equal to or greater than the predetermined angle A and the maximum vertical angle θd is less than the predetermined angle B. In this case, the driver D looks mainly ahead, so that the second camera 7 is activated.

Figure 15:
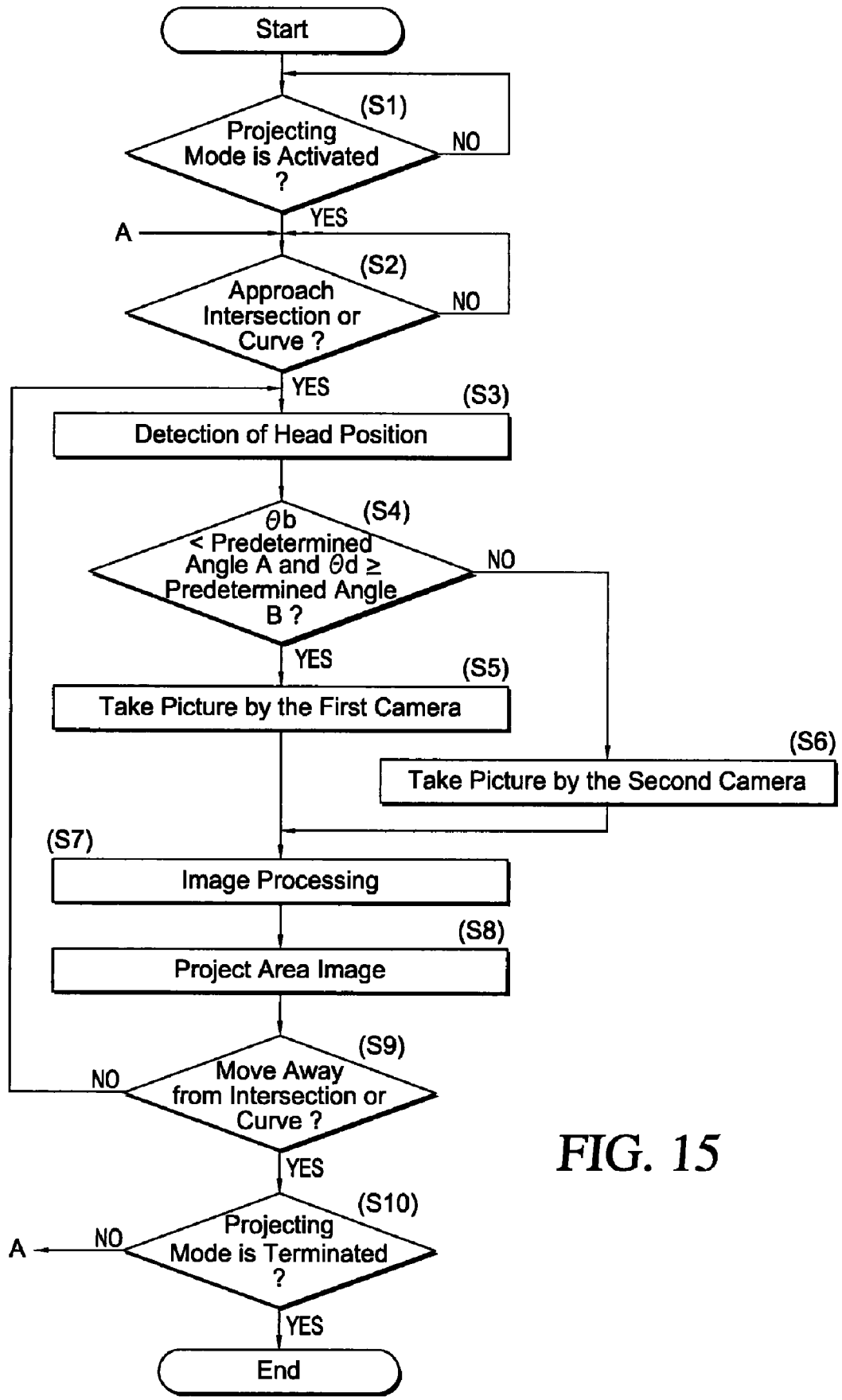
FIG. 15 is flowchart of an embodiment of the method of the present invention.

Next, an embodiment of the method of the present invention will be described with reference to FIG. 15. The control section 10 of the driving support unit 2 waits for a request to start a projecting mode to project an area image on the inner side of the pillar P (Step S1). For example, when the touch panel and/or the operation switch 26 is operated, a request signal is generated which is received by the control section 10 through the external input I/F section 25, and it is determined that the projecting mode should be started. Alternatively, it may be determined that the projecting mode should be started responsive to an on-signal from an ignition module (not shown).

When it is determined that the projecting mode should be started (Step S1=YES), the control section 10 determines whether the vehicle C is approaching an intersection or a curve, on the basis of road data within route data 16 or map drawing data 17 (Step S2). More specifically, when the control section 10 determines that the current position of the vehicle C is approaching an intersection, e.g. a T-shaped intersection, or a curve which has a curvature equal to or greater than a predetermined curvature over a predetermined distance (for example, 200 m), it is determined that the vehicle C is approaching the intersection or the curve.

When it is determined that the vehicle C is approaching the intersection or the curve (Step S2=YES), the control section 10 detects the head position of the driver D by means of the position detecting sensors 8a through 8c (Step S3). The control section 10 obtains the relative distances L1 through L3, which extend between each of the position detecting sensors 8a through 8c and the head D1, through the sensor I/F section 23. Then the relative distances L1 through L3 are applied to the head position coordinates table 11a to determine the coordinates of the center point Dc of the head D1.

Next, the control section 10 calculates the horizontal tangent lines T1 and T2 and the tangent lines T3 and T4 which are vertically inclined by using the coordinates of the center point Dc as described above, and further calculates the blind spot horizontal angle θ1 and the blind spot vertical angle θ2.

After calculating the blind spot angles θ1 and θ2, the control section 10 determines whether the maximum horizontal blind spot angle θb is less than the predetermined angle A and whether the maximum vertical blind spot angle θd is equal to or greater than the predetermined angle B (Step S4).

When it is determined that the maximum horizontal blind spot angle θb is equal to or greater than the predetermined angle A or that the maximum vertical blind spot angle θd is less than the predetermined angle B (Step S4=NO), the driver D is looking ahead or at the area near the vehicle C in the right front direction of the vehicle C. Therefore, the control section 10 activates the second camera 7 because the field of view of the second camera 7 is similar to the field of view of the driver D and the second camera 7 takes the image of the area Z2 in front of the vehicle C (Step S6). The second camera 7 outputs image signals M to the image data input section 22 and the image data input section 22 A/D converts those image signals M and outputs image data G to the image processor 20.

The image processor 20 processes image data G which was input from the image data input section 22 by adjusting at the center point Dc of the head D1 (Step S7). Thus, the method includes not only selection of one of the cameras 6 and 7, in accordance with the center point Dc but also executes image processing, such as coordinate conversion, in accordance with the current position of the center point Dc, to generate an image which is similar to the actual view. The image processor 20 reads the mask pattern 40 from the ROM 12, reads pixel data of image data G for the image display section 40a of the mask pattern 40 and reads pixel data of the projector 4 for the other area, i.e. the area not to be displayed. Then the control section 10 generates output data OD.

Figure 16:
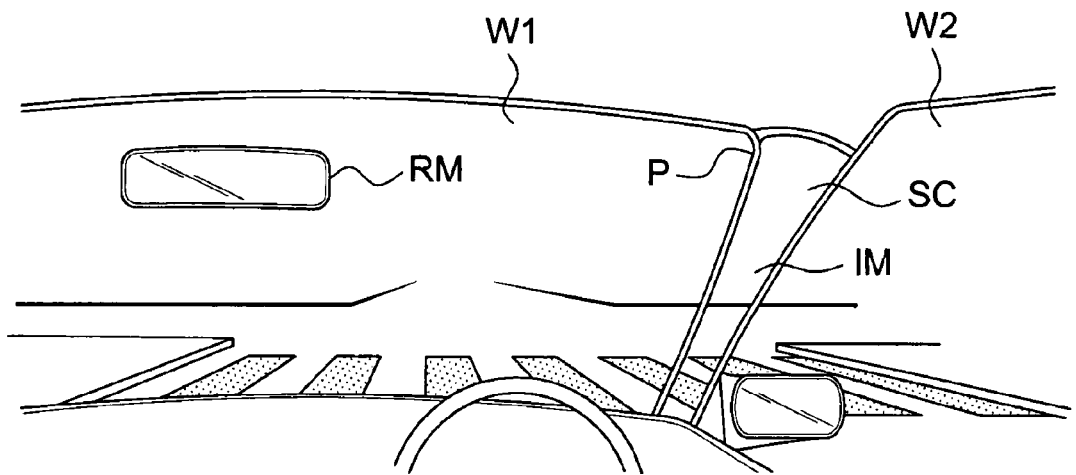
FIG. 16 is a diagram showing an image projected onto the pillar.

After generating output data OD, the image processor 20 outputs the data OD to the projector 4 and the projector 4 D/A converts that data OD and projects the area image onto the screen SC on the pillar P (Step S8). As a result, as shown in FIG. 16, the area image IM is displayed on the screen SC. The area image IM in FIG. 16 is provided by the second camera 7 which captures the image of an area, the major portion of which is in front of the vehicle C. Therefore, the actual view of the driver through the front window W1 and through the door window W2 and the area image IM are smoothly connected so as to be properly contiguous with each other.

When the area image IM is displayed on the screen SC, the control section 10 determines whether the vehicle C has moved away from the intersection or the curve (Step S9). When it is determined that the vehicle C is approaching or has entered the intersection or the curve (Step S9=NO), the routine returns to Step 3 and the control section 10 obtains signals from the position detecting sensors 8a through 8c and calculates the coordinates of the center point Dc of the head D1.

When the vehicle C has arrived at the intersection, the driver D may slouch forward to look down the road which is to be crossed by the vehicle C. When the driver wants to turn right, the driver may also check the shape of the road which is to be crossed by the vehicle C. In such cases, the head D1 of the driver D is moved away from the pillar and forward. As a result, the maximum angle θb of the blind spot angle θ1 is less than the predetermined angle A (45 degrees) and the maximum angle θd of the blind spot angle θ2 is equal to or greater than the predetermined angle B (15 degrees) (Step S4=YES).

Therefore, the control section 10 activates the first camera 6 to capture the image of the side area Z1 because the field of view of the first camera 6 is similar to the area as actually seen by the driver D at that time (Step S5). The first camera 6 outputs the image signal M to the image data input section 22 and the image data input section 22 A/D converts the image signal M and outputs the image data G to the image processor 20.

Figure 17:
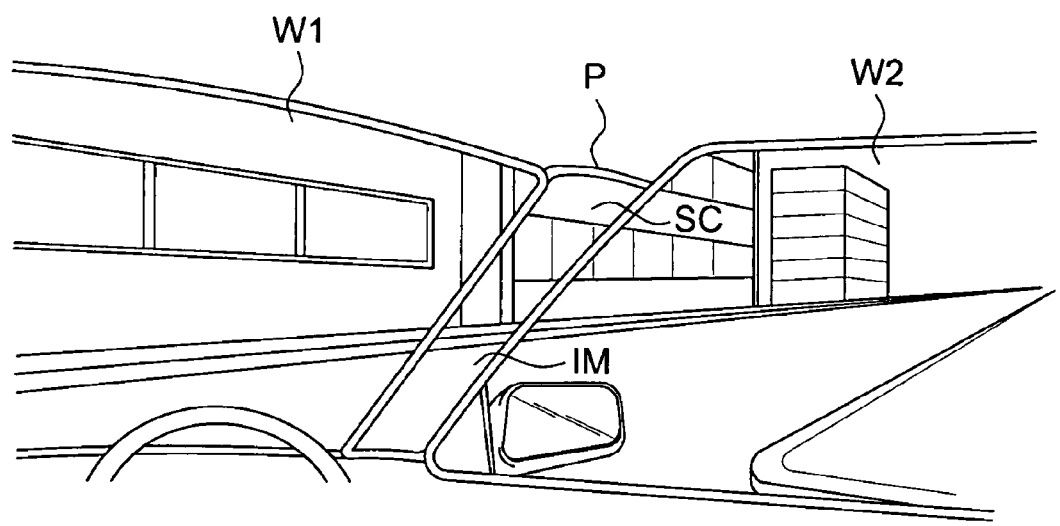
FIG. 17 is a diagram showing an image projected onto the pillar.

The image processor 20 processes the input image data G which is input from the image data input section 22 to adjust the image data G according to the center point Dc of the head D1 (Step S7) and generates output data OD. The image processor 20 then outputs the output data OD to the projector 4 and the projector 4 D/A converts the output data OD and projects an area image IM onto the screen SC on the pillar P (Step S8), as shown in FIG. 17. The area image IM may include a road shape or an obstacle which the driver can not see with his/her back against the front seat F. Therefore, the actual view from the front window W1 and the door window W2 seen by the driver D at that time and the area image IM are smoothly connected (properly contiguous) with each other.

When it is determined that the vehicle C is moving away from the intersection or the curve (Step S9=YES), the control section 10 determines whether or not the projecting mode is terminated (Step S10). For example, when the touch panel or the operation switch 26 is operated or when an off-signal of the ignition module is input, the control section 10 determines that the projecting mode is terminated (Step S10=YES) and the routine is terminated. When it is determined that the projecting mode has not yet been terminated (Step S10=NO), the routine returns to Step S2 and the execution of the processing is suspended until the vehicle C approaches an intersection or a curve. When the vehicle C approaches the intersection or the curve (Step S2=YES), the routine described above is repeated.

The embodiment described above provides the following advantages.

The control section 10 of the driving support unit 2 calculates the coordinates of the center point Dc of the head D1 of the driver D on the basis of the first through third position detecting sensors 8a through 8c. Further, the blind spot angles $\theta 1$ and $\theta 2$ due to the presence of the pillar P are calculated on the basis of the position of the head D1. When the maximum blind spot angle $\theta b$ is less than the predetermined angle A (45 degrees) and when the maximum blind spot angle $\theta d$ is equal to or greater than the predetermined angle B (15 degrees), the control section 10 activates the first camera 6 to capture the image of the area to the side of the vehicle C. Under any other conditions, the control section 10 activates the second camera 7 to capture the image of the area to the front of the vehicle C. Then, the control section 10 processes the image data G provided by the first camera 6 or the second camera 7 by adjusting in accordance with the coordinates of the center point Dc and outputs the generated output data OD to the projector 4. The projector 4 projects the output data OD onto the screen SC on the interior side of the pillar P. Therefore, even when the driver D slouches forward to view the right front area of the vehicle C or when the driver D is seated leaning back against the front seat F, a suitable area image IM corresponding to the body position of the driver D is displayed, so that the actual view of the driver D at that time and the area image IM are smoothly connected (merged) with each other so that driving safety is enhanced.

The control section 10 of the driving support unit 2 detects the coordinates of the center point Dc of the head D1 of the driver D and the blind spot angles $\theta 1$ and $\theta 2$ are calculated on the basis of the center point Dc, so that a relatively accurate maximum angle $\theta b$ and minimum angle $\theta c$ may be calculated.

The foregoing embodiment not only selects the first camera 6 or the second camera 7 in accordance with the body position of the driver D but also converts coordinates of image data G, which is input from the camera 6 or 7, by use of the image processor 20. Therefore, the real view from the front window W1 and the door window W2 as seen by the driver D at that time and the area image IM are smoothly connected (merged) with each other.

The control section 10 calculates the maximum blind spot angle $\theta b$ and the maximum blind spot angle $\theta d$ on the basis of the coordinates of the center point Dc of the head D1. Then, the camera 6 or the camera 7 is selected in accordance with the maximum blind spot angle $\theta b$ and the maximum angle blind spot $\theta d$. That is, selection of the camera 6 or the camera 7 is made on the basis of the viewing area of the driver D (on the basis of the direction of the blind spot of the driver D), so that the area image IM which is displayed in a manner properly connecting with (in register with) the actual view of the driver.

The embodiment described above may be modified as follows.

In the embodiment described above, the control section 10 determines (1) whether or not the vehicle C is approaching an intersection on the basis of route data 16 and (2) whether or not the vehicle C is approaching a curve, having a curvature equal to or greater than a predetermined curvature, on the basis of map drawing data 17. However, it is also possible for the control section 10 to determine approach to an intersection on the basis of map drawing data 17 or other data. Further, it may be possible for the control section 10 to determine approach to a curve having a curvature equal to or greater than the predetermined curvature on the basis of route data 16 or other data.

In the embodiment described above, the position detecting sensors 8a through 8c are mounted near the front rear-view mirror RM, on the upper side of the door window W2, and on the head rest FH of the front seat F. However, the position detecting sensors 8a through 8c may be mounted at other locations. Further, although three sensors are used to detect the position of the head D1 in the foregoing embodiment, two sensors or more than four sensors may be used. Further, although ultrasonic sensors are used in the foregoing embodiment as the position detecting sensors 8a through 8c, infrared sensors or another type of sensor may be used instead.

In the embodiment described above, the ultrasonic sensors 8a through 8c detect the position of the head D1 of the driver D. However, a camera attached near the driver's seat may capture an image of the area surrounding the driver's seat and the head position of the driver may be detected by image processing such as feature-point matching detection or pattern matching processing.

In the embodiment described above, the relative distances L1 through L3 are compared with the head position coordinates in table 11a and the coordinates of the center point Dc of the head D1 are thereby determined. However, the control section 10 may calculate the position of the center point Dc of the head D1 on the basis of the relative distances L1 through L3 without using the head position coordinates table 11a.

In the embodiment described above, the table stored in the main memory has the coordinates of the center point Dc of the head D1 correlated with the maximum blind spot horizontal angle $\theta b$ and the maximum blind spot vertical angle $\theta d$. However, the coordinates of the center point Dc, the maximum angle $\theta b$ and the maximum angle $\theta d$ may be calculated.

In the embodiment described above, the image data input section 22 generates image data G. However, image data G may be generated by A/D conversion by the camera 6 or the camera 7.

In the embodiment described above, the first camera 6 is activated when the maximum the blind spot horizontal angle θd is less than the predetermined angle A and when the maximum the blind spot vertical angle θd is equal to or greater than the predetermined angle θ. However, the first camera 6 may be activated only on the basis that the maximum blind spot horizontal angle θb is less than the predetermined angle A. Alternatively, only the maximum blind spot vertical angle θd need be determined to be equal to or greater than the predetermined angle B, to activate the first camera 6 to capture the image.

In the embodiment described above, it may be determined whether the first camera 6 or the second camera 7 should be used in accordance with the sizes of the blind spot angles θ1 and θ2.

In the embodiment described above, the blind spot angles θ1 and θ2 for the driver D are calculated on the basis of the coordinates of the center point Dc of the head D1. However, the selection of the first camera 6 or the second camera 7 may be dependent on where the center point Dc is located within the head moving range Z3. For example, when the driver D slouches forward, it is determined that the head D1 is located in the left front of the head moving range Z3, so that the first camera 6 is activated. On the other hand, when it is determined that the head D1 is located in the right front or rear of the head moving range Z3, the second camera 7 is activated. As a result, the processing load on the driving support unit 2 may be reduced and the area image IM, which is smoothly connecting with the actual view of the driver, may be relatively easily displayed even though the actual view keeps changing with the movement of the vehicle C.

In the embodiment described above, there are two cameras, the camera 6 and the camera 7, mounted in the vehicle C. However, three or more cameras may be provided. Even in this case, one camera is selected among the three or more cameras to capture the image on the basis of the blind spot angles θ1 and θ2 of the driver D or the center point Dc of the head D1, and a suitable area image IM corresponding to the posture of the driver is displayed.

In the embodiment described above, the area image IM is displayed on the pillar P on the driver's seat side (the right front pillar in the foregoing embodiment). However, the area image IM may be displayed on the pillar on the other side of the driver's seat. Likewise, in this case also, the coordinates of the head D1 and the blind spot angles θ due to the presence of the pillar are calculated and it is determined which camera should be activated dependent on the calculated angles.

In the embodiment described above, the projector 4 projects the area image IM on the interior side of the pillar P. However, instead, a flat-screen display may be mounted on the interior side of the pillar P and the image processor 20 may output the output data OD onto the flat-screen display.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support apparatus for capturing an image of an area, which is hidden as a blind spot of a driver of a vehicle due to presence of a pillar of the vehicle, and for displaying a captured image on an interior side of the pillar, comprising:
    plural imaging devices mounted at different positions on the vehicle to capture images of different blind spot areas created by the presence of the pillar and position of the driver;
    detecting means for detecting position of the driver seated in a driver's seat in the vehicle;
    angle calculating means for calculating an angle of the blind spot due to the presence of the pillar on the basis of the detected position of the driver;
    selecting means for selecting one of the imaging devices, in accordance with the calculated angle of the blind spot, from among the plural imaging means;
    image signal obtaining means for receiving an image signal from the selected imaging device; and
    output control means for displaying an image of the blind spot area on the interior side of the pillar in the vehicle, on the basis of the image signal which is received from the selected imaging device.

2. The driving support apparatus according to claim 1, wherein:
    the detecting means detects coordinates of the head of the driver.

3. The driving support apparatus according to claim 1, further comprising:
    image processing means for image processing of the image signal received from the selected imaging means, in accordance with the detected position of the driver.

4. The driving support apparatus according to claim 1 wherein the two imaging devices are mounted at different positions on the pillar.

5. The driving support apparatus according to claim 1 wherein the two imaging devices are mounted at opposing upper and lower ends of the pillar.

6. The driving support apparatus according to claim 1 wherein the blind spot image displayed on the interior side of the pillar is in register with the actual view of the driver through the front window and front door window so that the displayed image merges with the driver's actual view.

7. The driving support apparatus according to claim 1 wherein the output control means includes a projector focused on the pillar.

8. A driving support method for capturing and displaying an image of an area, which is hidden as a blind spot of a driver of a vehicle due to presence of a pillar of the vehicle, comprising:
    imaging the blind spot using plural imaging devices mounted at different positions on the vehicle to capture images of different blind spot areas created by the presence of the pillar and position of the driver;
    detecting position of the driver seated in a driver's seat in the vehicle;
    calculating an angle of the blind spot due to the presence of the pillar on the basis of the detected position of the driver;
    selecting one of the imaging devices, in accordance with the calculated angle of the blind spot, from among the plural imaging devices;
    receiving an image signal from the selected imaging device; and
    displaying an image of the blind spot area on the interior side of the pillar in the vehicle, on the basis of the image signal which is received from the selected imaging device.

9. The driving support method according to claim 8, wherein:

coordinates of the head of the driver are detected as the position of the driver.

10. The driving support method according to claim 8, further comprising:
    image processing the image signal received from the selected imaging device in accordance with the detected position of the driver.

11. A driving support apparatus for capturing an image of an area, which is hidden as a blind spot of a driver of a vehicle due to presence of a pillar of the vehicle, and for displaying a captured image on an interior side of the pillar, comprising:
    plural imaging devices mounted at different positions on the vehicle to capture images of different blind spot areas created by the presence of the pillar and position of the driver, the plural imaging devices including a first imaging device which captures a first image and a second imaging device which captures a second image, at least a major portion of the first image including an area to a front side of the vehicle and at least a major portion of the second image including an area in front of the vehicle;
    detecting means for detecting position of the driver seated in a driver's seat in the vehicle;
    angle calculating means for calculating a maximum horizontal blind spot angle of the blind spot due to the presence of the pillar on the basis of the detected position of the driver;
    selecting means for selecting one of the imaging means, in accordance with the calculated maximum horizontal blind spot angle, from among the plural imaging means, wherein the selecting means, responsive to a determination that a maximum horizontal blind spot angle due to the presence of the pillar is less than predetermined angle, selects the first imaging device to capture an image, and, responsive to a determination that the maximum horizontal blind spot angle is equal to or greater than the predetermined angle, selects the second imaging device to capture an image;
    image signal obtaining means for receiving an image signal from the selected imaging means; and
    output control means for displaying an image of the blind spot on the interior side of the pillar in the vehicle, on the basis of the image signal which is received from the imaging means.

12. A driving support method for capturing and displaying an image of an area, which is hidden as a blind spot of a driver of a vehicle due to presence of a pillar of the vehicle, comprising:
    imaging the blind spot using plural imaging devices mounted at different positions on the vehicle to capture images of different blind spot areas created by the presence of the pillar and position of the driver, the plural imaging devices include a first imaging device for capturing an image at least a major portion of which includes an area to a front side of the vehicle and a second imaging device for capturing an image at least a major portion of which includes an area in front of the vehicle;
    detecting position of the driver seated in a driver's seat in the vehicle;
    calculating a maximum blind spot angle for the blind spot due to the presence of the pillar on the basis of the detected position of the driver;
    responsive to a determination that a calculated maximum horizontal blind spot angle due to the presence of the pillar is less than predetermined angle, selecting the first imaging device to capture an image, and, responsive to a determination that the calculated maximum horizontal blind spot angle is equal to or greater than the predetermined angle, selecting the second imaging device to capture an image;
    receiving an image signal from the selected imaging device; and
    displaying an image of the blind spot area, captured by the selected imaging device, on the interior side of the pillar in the vehicle, on the basis of the image signal which is received from the selected imaging device.

* * * * *